US006852345B2

(12) United States Patent
Hill et al.

(10) Patent No.: US 6,852,345 B2
(45) Date of Patent: Feb. 8, 2005

(54) STABILIZED CHEWING GUM BASE

(75) Inventors: Valerie Anne Hill, Akron, OH (US); Barbara Ann Ford, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 175 days.

(21) Appl. No.: 10/331,260

(22) Filed: Dec. 30, 2002

(65) Prior Publication Data

US 2003/0124220 A1 Jul. 3, 2003

Related U.S. Application Data

(60) Provisional application No. 60/344,576, filed on Dec. 28, 2001.

(51) Int. Cl.[7] .................................................. A23G 3/30
(52) U.S. Cl. .......................................................... 426/3
(58) Field of Search ......................................... 426/3, 5

(56) References Cited

U.S. PATENT DOCUMENTS

| | | | | | |
|---|---|---|---|---|---|
| 5,567,450 | A | * | 10/1996 | Zuromski et al. | 426/5 |
| 5,879,728 | A | * | 3/1999 | Graff et al. | 426/5 |
| 6,180,144 | B1 | * | 1/2001 | Hill et al. | 426/3 |
| 6,231,896 | B1 | * | 5/2001 | Ford et al. | 426/3 |

FOREIGN PATENT DOCUMENTS

| | | | |
|---|---|---|---|
| JP | 59-103665 | * | 6/1984 |
| JP | 11-180839 | * | 7/1999 |

* cited by examiner

Primary Examiner—Arthur L. Corbin

(74) Attorney, Agent, or Firm—Alvin T. Rockhill

(57) ABSTRACT

Styrene butadiene rubber (SBR) is widely used as a chewing gum base in lieu of natural gums. It is necessary to protect chewing gum SBR with a food grade antioxidant stabilizer system. This invention discloses a chewing gum rubber composition (gum base) that utilizes carnosic acid from a Libiatae plant, such as rosemary or sage, as an antioxidant stabilizer. In the practice of this invention the chewing gum base also containg lecithin that can be used as an emulsifier for the carnosic acid. This invention more specifically discloses a chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) carnosic acid, and (5) lecithin, wherein said chewing gum base is void of sweeteners. The subject invention also reveals a chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) carnosic acid, and (5) lecithin, wherein said chewing gum base is void of flavoring agents. The present invention further discloses a chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) carnosic acid, and lecithin, wherein said chewing gum base is void of colorants.

19 Claims, No Drawings

STABILIZED CHEWING GUM BASE

This application claims the benefit of U.S. Provisional Patent Application Ser. No. 60/344,576, filed on Dec. 28, 2001.

BACKGROUND OF THE INVENTION

Today ordinary chewing gums and bubble gums generally utilize as their gum base one or a combination of two or more natural or synthetic elastomers. The gum base that is selected provides the chewing gum with its masticatory properties. A chewing gum base is normally admixed with sugars or synthetic sweeteners, perfumes, flavors, plasticizers, and fillers; and then milled and formed into sticks, sheets, or pellets. Cottonseed oil is sometimes also added to give the gum softness. Styrene butadiene rubber (SBR) is a synthetic elastomer that is widely used as a gum base in chewing gums. However, SBR is not widely used in manufacturing soft chew gums because it lacks the desired physical properties. Polyisobutylene is widely used in manufacturing soft chew gums even though it is much more expensive than SBR.

In any case, chewing gum compositions are typically comprised of a water soluble bulk portion, a water insoluble chewing gum base portion and typically water insoluble flavoring agents. The water soluble portion dissipates with a portion of the flavoring agent over a period of time during chewing. The gum base portion is retained in the mouth throughout the chewing process.

The gum base includes a number of ingredients that are subject to deterioration through oxidation during storage. The insoluble gum base is generally comprised of elastomers, elastomer plasticizers, waxes, fats, oils, softeners, emulsifiers, fillers, texturizers and miscellaneous ingredients, such as antioxidants, preservatives, colorants and whiteners. The compounds containing carbon-carbon double bonds, such as fats, oils, unsaturated elastomers and elastomer plasticizers, are susceptible to oxidation. The gum base constitutes between 5–95% by weight of the chewing gum composition, more typically 10–50% by weight of the chewing gum, and more commonly 15–35% by weight of the chewing gum.

In chewing gum base natural or artificial antioxidants are utilized to stabilize the rubbery polymer. For instance, beta-carotenes, acidulants (e.g. Vitamin C), propyl gallate, BHA, and BHT are commonly used to stabilize the rubber used in manufacturing chewing gum. Such antioxidants are included in chewing gum base as a stabilizer to inhibit oxidation.

Antioxidants are widely used in food products susceptible to degeneration, in one form or another, due to oxidation. "Antioxidants" are defined by the Food and Drug Administration (21 CFR §170.3) as "substances used to preserve food by retarding deterioration, rancidity, or discoloration due to oxidation." Commercial applications include use in processed meat and poultry, salad dressings, seasonings, snacks, nuts, soup bases, edible fats and oils, natural foods, pet foods and packaging. In addition to foods, antioxidants have been used to prevent oxidation in various cosmetic and toiletry products and in medicinal or pharmaceutical preparations. The primary purpose in each of these applications is to prevent deterioration of desirable product characteristics by inhibiting oxidation.

More recently, antioxidants in food sources and dietary supplements have received attention for their potential to prevent or delay the onset of certain cancers and other chronic health conditions including heart disease, cataracts and aging. The theory is that, by preventing oxidation, these materials inhibit the formation of oxygen containing free radicals that are believed to play a significant role in initiation of these conditions and other chronic disorders.

The use of spices to prevent food deterioration as well as to impart flavor has been known for centuries. Because of their cost and availability, however, synthetic antioxidants, such as butyl hydroxyanisole ("BHA") and butylated hydroxytoluene ("BHT"), have been predominant in commercial food preparation. These antioxidants have proven to be quite effective. However, there is currently a desire to utilize natural antioxidants in food products and chewing gum.

There is a growing desire for chewing gum base that is stabilized with a natural stabilizer. U.S. Pat. No. 4,489,099 discloses the use of Vitamin E in combination with dilauryl thiodipropionate (DLTDP), as a stabilizer for a styrene-butadiene rubber in chewing gum. U.S. Pat. No. 5,132,121, U.S. Pat. No. 5,200,213, and U.S. Pat. No. 5,270,060 disclose a use of 0.01–1.00% by weight of a tocopherol mixture comprising 7–20% by weight alpha tocopherol, 45–75% by weight gamma tocopherol and 18–32% by weight delta tocopherol to stabilize chewing gum base.

Carnosic acid is a phenolic diterpene that corresponds to the empirical formula $C_{20}H_{28}O_4$. It occurs naturally in plants of the Libiatae family. For instance, carnosic acid is a constituent of the species *Salvia officinalis* (sage) and *Rosmarinus officinalis* (rosemary) where it is mainly found in the leaves. Carnosic acid is also found in thyme and marjoram. It was discovered by Linde in *Salvia officinalis* [Helv. Chim Acta 47, 1234 (1962)] and by Wenkert et al. in *Rosmarinus officinalis* [J. Org. Chem. 30, 2931 (1965)]. It was then positively identified in various other species of sage, such as for example *Salvia canariensis* [Savona and Bruno, J. Nat. Prod. 46, 594 (1983)] or *Salvia willeana* [de la Torre et al., Phytochemistry 29, 668 (1990)]. It is also present in *Salvia triloba* and *Salvia sclarea*.

Carnosic acid is a powerful antioxidant [Brieskorn and Domling, Z. Lebensm. Unters. Forsch. 141, 10 (1969)] and, according to a number of Russian works where it bears the name salvine, an antibiotic against *Staphylococcus aureus* [CA 86, 117603r; 90, 49011b; 97, 67513r, 69163a, 69164b; 104, 221930w; 111, 130594t] and against certain microorganisms responsible for dental caries and bad breath [CA 97, 84835q]. In connection with this latter property, it is disclosed in Japanese Patent Publication 59-103665 to Lion Corporation that carnosic acid can be incorporated into tooth paste and chewing gum to remove smells for the mouth. Japanese Patent Publication 11180839 also discloses that carnosic acid, carnosol, and rosemanol can be used in dentifrice, mouthwash, tablets for gargling, troches, candies, and chewing gum as a deodorant for the oral cavity.

Dried leaves of rosemary or sage contain between 1.5 and 2.5% carnosic acid and about 0.3–0.4% carnosol which is also an antioxidant. Rosmanol and rosmaridiphenol are present in smaller concentrations. Accordingly, from the point of view of the economy of a production process, carnosic acid has an indisputable advantage. According to the data disclosed in U.S. Pat. No. 4,450,097 it may be calculated that the yield of rosmanol isolated from rosemary is only 0.01%.

Wenkert et al. have demonstrated that carnosol is an oxidative artifact of carnosic acid. This oxidation takes place in the presence of oxygen both after the harvesting of rosemary or sage in the leaves left to dry in air (it can be demonstrated that the freshly cut leaves of rosemary do not contain carnosol) and when the leaves are subjected to extraction with solvents or when the extracts themselves are subjected to conventional operations of fractionation, enrichment and purification. There is every reason to assume that rosmanol, which has been identified in a rosemary fraction subjected to an alkaline treatment, is itself a subsequent product of the oxidation of carnosic acid, as Wenkert et al. have suggested. The same may also be reasonably assumed of rosmaridiphenol. Carnosic acid is therefore the only phenolic diterpene present in the native state in rosemary and sage.

Some methods for the preparation of carnosic acid by chemical synthesis have also been proposed in the literature by W. L. Meyer et al. [Tetrahedron Letters 1966, 4261; 1968, 2963; J. Org. Chem. 41, 1005 (1976)]. However, the syntheses involved are long and complex and, for economic reasons, cannot be applied to an industrial process. In addition, these syntheses lead to racemic mixtures of carnosic acid precursors and not to the pure enantiomers. It should also be pointed out that these works stop at the preparation of carnosic acid precursors and omit to describe the final preparation step(s). Another method of obtaining carnosic acid has been described in the literature by Brieskorn and Domling [Arch. Pharm. 302, 641 (1969)], comprising the catalytic reduction of carnosol. Once again, the application of this process on a large scale could not be envisaged on account of the non-availability of carnosol.

U.S. Pat. No. 5,859,293 and U.S. Pat. No. 5,256,700 disclose techniques for extracting high purity carnosic acid from rosemary and sage. For example, U.S. Pat. No. 5,256,700 discloses a process for obtaining carnosic acid comprising extracting a vegetable material selected from the group consisting of sage and rosemary with an apolar solvent to obtain an extract containing apolar compounds including carnosic acid, contacting the extract with an adsorbent material having an affinity for polar compounds for adsorbing the carnosic acid to separate the carnosic acid from the apolar compounds of the extract, desorbing the adsorbent material with a polar solvent to obtain the carnosic acid in the solvent and then evaporating the polar solvent from the carnosic acid to obtain a residue containing the carnosic acid.

U.S. Pat. No. 6,180,144 discloses a chewing gum rubber composition (gum base) that utilizes carnosic acid from a Libiatae plant, such as rosemary or sage, as an antioxidant stabilizer. U.S. Pat. No. 6,180,144 more specifically discloses a chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; and (4) carnosic acid. U.S. Pat. No. 6,180,144 further discloses a chewing gum which comprises: (1) about 5 weight percent to about 95 weight percent styrene-butadiene rubber, wherein said styrene-butadiene rubber has a bound styrene content of about 1 weight percent to about 10 weight percent, and wherein said styrene-butadiene rubber has a RPA $t_{80}$ of at least 0.060 minutes; (2) about 0 weight percent to about 75 weight percent of an elastomer plasticizer selected from the group consisting of natural rosin esters and synthetic terpene resins; (3) about 1 weight percent to about 65 weight percent of a filler material; and (4) carnosic acid, (5) a sweetener, and (6) a flavor.

U.S. Pat. No. 6,231,896 discloses discloses a chewing gum rubber composition (gum base) that utilizes carnosic acid from a Libiatae plant, such as rosemary or sage, as an antioxidant stabilizer. This invention more specifically discloses a chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; and (4) carnosic acid, wherein said chewing gum base is void of sweeteners, flavoring agents or colorants and a water-soluble portion.

SUMMARY OF THE INVENTION

This invention is based upon the discovery that lecithin can be employed to emulsify carnosic acid that is used to stabilize rubbery polymers, such as chewing gum base. Carnosic acid that has been emulsified with lecithin can be used to protect chewing gum rubber from oxidation and to stabilize it during processing and subsequently in the gum base and chewing gum. The carnosic acid will stabilize virtually any type of rubbery polymer used in chewing gum, such as styrene-butadiene rubber, polyisobutulene, isobutylene-isoprene copolymer elastomers, polyvinylacetate, natural gums, and mixtures thereof. Some specific examples of natural gums that can be stabilized with carnosic acid include jelutong, lechi caspi, perillo, massaranduba balata, massaranduba chocolate, nispero, rosindinha, chicle, gutta hang kang, and mixtures thereof.

Carnosic acid that is emulsified with lecithin can also be used as an antioxidant in rubbers that are used in non-food applications. For example, it can be used to stabilize rubbers used in tires and industrial products, such as hoses and power transmission belts. In fact, carnosic acid that is emulsified with lecithin will act as an antioxidant in any unsaturated rubber (any rubber containing carbon-carbon double bonds). Thus, carnosic acid that is emulsified with lecithin can be used to stabilize styrene-butadiene rubber, high cis-1,4-polybutadiene rubber, medium vinyl polybutadiene rubber, synthesic polyisoprene rubber, natural rubber, styrene-isoprene rubber (SIR), styrene-isoprene-butadiene rubber (SIBR), nitrite rubber, carboxylated nitrile rubber, bromobutyl rubber, chlorobutyl rubber, and the like.

The present invention more specifically discloses a chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) carnosic acid, and (5) lecithin, wherein said chewing gum base is void of sweeteners.

The subject invention also reveals a chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) carnosic acid, and (5) lecithin, wherein said chewing gum base is void of flavoring agents.

The present invention further discloses a chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) carnosic acid, and (5) lecithin, wherein said chewing gum base is void of colorants.

The present invention also reveals a stabilizer rubber which is comprised of a rubbery polymer, carnosic acid, and lecithin, wherein said stabilized rubber is void of sweeteners and/or flavoring agents. Such stabilized rubbers can also be void of colorants and humectants. The rubbery polymer can be virtually any synthetic or natural rubber, such as styrene-butadiene rubber, polybutadiene rubber, natural rubber synthetic polyisoprene rubber, styrene-isoprene rubber, styrene-isoprene-butadiene rubber, nitrile rubber, carboxylated nitrite rubber, and the like.

DETAILED DESCRIPTION OF THE INVENTION

This invention reveals the use of carnosic acid that is emulsified with lecithin as a stabilizer system for rubbery polymers. Carnosic acid is particularly useful for stabilizing chewing gum rubber compositions. The carnosic acid protects the rubber during processing and provides it with adequate antioxidant protection during the service life of the final product, such as chewing gum, tires, hoses, belts, and the like. The carnosic acid used will typically come from a plant in the Libiatae family, such as rosemary, sage, thyme or marjoram. Unfortunately, antioxidants extracted from naturally occurring spices generally exhibit flavors, odors, and colors that can be undesirable in some applications. Accordingly, efforts are typically made to extract the carnosic acid from the plant material in high purity. High purity carnosic acid is typically recovered by extraction and isolation from plant matter of the Labiatae family. Various techniques for recovering carnosic acid from Labiatae plants is disclosed in U.S. Pat. No. 5,859,293, U.S. Pat. No. 5,256,700, U.S. Pat. No. 5,061,403, and U.S. Pat. No. 4,450,097. The teachings of these patents are hereby incorporated herein by reference in their entirety.

It should be noted that other compounds having antioxidant characteristics will also frequently be present in the carnosic acid source. For instance, carnosol, rosmanol and rosmaridiphenol will also frequently be present. It is believed that carnosol, rosmanol and rosmaridiphenol help to further improve the stability of rubbery polymers. Thus, there is no need to make an effort to remove them from the carnosic acid source. In fact, the carnosol, rosmanol and/or rosmaridiphenol may act synergistically with the carnosic acid to improve the stability of the rubbery polymer. In some applications, the flavor of the spice, such as rosemary, is desirable. In such cases it is not necessary to highly purify the carnosic acid in an effort to remove the flavor of the spice. A rosemary extract having the aroma and flavor characteristics of rosemary is commercially available from Cultor Food Science, Inc.

The chewing gum base compositions of this invention are comprised of (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; and (4) carnosic acid. The rubbery elastomer used in the chewing gum base will typically be a styrene-butadiene rubber, a polyisobutulene rubber, a isobutylene-isoprene copolymer elastomers, a polyvinylacetate, or a natural gum, such as jelutong, lechi caspi, perillo, massaranduba balata, massaranduba chocolate, nispero, rosindinha, chicle, gutta hang kang, and mixtures thereof. The rubbery elastomer can, of course, also be a mixture of such natural and synthetic rubbery polymers. These chewing gum rubber compositions can then be used with excellent results as the gum base in the production of chewing gum. The chewing gum base compositions of this invention will be employed in conjunction with other chewing gum ingredients (additives) to form chewing gum. More specifically, sweeteners, flavoring agents, and colorants are added to the chewing gum base in manufacturing chewing gum. A humectant, such as aqueous sorbitol or glycerin, is also normally added to chewing gum base in manufacturing chewing gum. This is because chewing gum base, including the chewing gum base of this invention, is void of sweeteners, flavoring agents, colorants (including whiteners), and humectants.

The carnosic acid can be distributed throughout rubbery polymer using a variety of techniques known to those skilled in the art. The preferred means of distributing the carnosic acid throughout synthetic rubbers synthesized by emulsion polymerization is by emulsifying it with a food grade emulsifier and then to add it to the emulsion of the rubber. The latex can then be coagulated using a standard salt-acid coagulation system known to those skilled in the art. The rubber composition which contains the carnosic acid can then be processed into chewing gum or other rubber products using standard techniques. The stabilized rubber compositions of this invention will contain a sufficient amount of carnosic acid to stabilize the chewing gum base. Normally the stabilized rubber will contain about 0.0001 phr to about 1 phr (parts by weight per 100 parts by weight of rubber) of carnosic acid. The stabilized rubber compositions of this invention will more typically contain about 0.0005 phr to about 0.1 phr of carnosic acid. The stabilized rubber compositions of this invention will preferably contain about 0.001 phr to about 0.05 phr of carnosic acid. The stabilized rubber compositions of this invention will preferably contain about 0.01 phr to about 0.03 phr of carnosic acid.

A number of food grade emulsifiers are satisfactory for emulsification of the carnosic acid. The food grade emulsifier will, of course, be used in a sufficient amount to emulsify the carnosic acid. Normally, from about 0.25 phr to about 5 phr of the food grade emulsifier will be utilized. More typically, from about 0.5 phr to about 2 phr of the food grade emulsifier will be employed. Saponified fatty acids can be used for this purpose. For instance, the emulsifier can be a vegetable oil, a mono-glyceride, a diglyceride, a triglyceride, lecithin, a hydrogenated fat or oil, a partially hydrogenated fat or oil, an edible animal fat or oil, or a salt of a fatty acid. Lecithin (phosphatidylcholine) is a food grade emulsifier that is highly preferred for this purpose. Lecithin is a phosphatide that is found in all living organisms (animal and plant) and is a significant constituent of nervous tissue and brain substance. It is widely used by the food industry because it is edible and digestible.

After being recovered and dried the rubber containing carnosic acid can be used in making chewing gum base. The chewing gum will incorporate the rubbery polymer and, optionally, various other water-insoluble elastomeric components that contribute to the elasticity of the chewing gum and the longevity of the chew. The elastomeric component generally constitute about 5 to about 95 weight percent of the gum base, more preferably about 10 to about 70 weight percent of the gum base and most preferably about 15 to about 45 weight percent of the gum base.

In addition to the rubbery elastomer, the gum base will typically include elastomer plasticizers, waxes, softeners/emulsifiers, fillers/texturizers, colorants, a stabilizer, and whiteners. Elastomer plasticizers constitute from about 0 to about 75 percent by weight of the gum base, preferably 5 to 45 per cent by weight and most preferably 10 to 30 per cent by weight. Elastomer plasticizers include natural rosin esters such as glycerol ester of partially hydrogenated rosin, glycerol ester of polymerized rosin, glycerol ester of partially dimerized rosin, glycerol ester of rosin, pentaerythritol esters of partially hydrogenated rosin, methyl and partially hydrogenated methyl esters of rosin, pentaerythritol ester of rosin or mixtures thereof. Elastomer plasticizers also include synthetics materials, such as terpene resins derived from alpha-pinene, beta-pinene and/or d-limonene.

The stabilizer included in the gum base will of course contain carnosic acid. The stabilizer system will also frequently contain carnosol, rosmanol, and reomaridiphenol since they are frequently present in the carnosic acid source. Other antioxidants such as Vitamin C, Vitamin E, and various mixtures of tocopherols, such as those described in U.S. Pat. No. 5,270,060 can also be included in the stabilizer system.

Waxes include synthetic (e.g. polyethylene and Fischer-Tropsch waxes) and natural (candelilla carnauba, beeswax, rice bran or mixtures thereof) and petroleum (e.g. microcrystalline and paraffin). Waxes, when used, generally constitute up to 30 weight percent of the gum base.

Softeners/emulsifiers include tallow, hydrogenated tallow, hydrogenated and partially hydrogenated vegetable oils, cocoa butter, glycerol monostearate, glycerol triacetate, lecithin, monoglycerides, diglycerides and triglycerides, acetylated glycerides and fatty acids (e.g. stearic, palmitic, oleic, linoleic and linolenic acids) or mixtures thereof. Softeners/emulsifiers generally constitute between 0.5 and 40 weight per cent of the gum base.

Fillers/texturizers include magnesium and calcium carbonate, ground limestone and silicate types such as magnesium and aluminum silicate, clay, alumina, talc as well as titanium oxide, monocalcium phosphite, dicalcium phosphite and tricalcium phosphate, cellulose polymers such as ethyl, methyl and wood or mixtures thereof. Preferably, the filler comprises about 1 to about 65 percent by weight of the gum base. Colorants and whiteners include FD&C-type dyes and lakes, fruit and vegetable extracts, titanium dioxide or mixtures thereof.

The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This can usually be achieved in about one to about four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

The water-soluble portion of the chewing gum may comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

Bulk sweeteners constitute between 20–80% by weight of the chewing gum and may include both sugar and sugarless sweeteners and components. Sugar sweeteners may include saccharide-containing components including but not limited to sucrose, maltose, dextrin, dried invert sugar, levulose, galactose, corn syrup solids, and the like, alone or in combination. The sugar can also be a monosaccharides of 5 or 6 carbon atoms, such as arabinose, xylose, ribose, glucose, mannose, galactose, fructose, dextrose, or sorbose or mixtures of two or more of the foregoing monosaccharides, disaccharides, for example, sucrose such as cane or beet sugar, lactose, maltose or cellobiose; polysaccharides, such as partially hydrolyzed starch or dextrin.

Sugarless sweeteners include components with sweetening characteristics but are devoid of the commonly known sugars. Sugarless sweeteners include, but are not limited to, sugar alcohols such as sorbitol, mannitol, xylitol, hydrogenated starch hydrolysates, maltitol, and the like, alone or in combination. Some additional examples of artificial sweeteners which may be employed include sodium, calcium or ammonium saccharin salts, free saccharin and, dihydrochalcones, dipotassium glycyrrhizin, glycyrrhizic acid ammonium salt, L-aspartyl-L-phenylalanine methyl ester (aspartame), the sodium or potassium salt of 3,4-dihydro-6-methyl-1,2,3-oxathiazine-4-one-2,2-dioxide (Ace-sulfame-K), as well as *Stevia rebaudiana* (Stevioside), *Richardella dulcifica* (Miracle Berry), *Diascoreophyllum cumminsii* (Serendipity Berry), cyclamate salts, and the like, or mixtures of any two or more of the above.

High intensity sweeteners can also be present. Such high intensity sweeteners may include but are not limited to sucralose, aspartame, salts of acesulfame, alitame, saccharin and its salts, cyclamic acid and its salts, dihydrochalcones, thaumatin, monellin, and the like, alone or in combination.

Combinations of sugar and/or sugarless sweeteners may be used in the chewing gum. The sweetener may also function in the chewing gum in whole or in part as a water soluble bulking agent. Additionally, the softener may also provide additional sweetness, such as with aqueous sugar or alditol solutions.

One or more flavoring agents may be present in the chewing gum in an amount within the range of about 0.1 to about 10.0 percent and preferably from about 0.5 to about 5.0 weight percent of the gum. The flavoring agents may comprise essential oils, natural or synthetic flavors or mixtures thereof including but not limited to oils derived from plants and fruits such as citrus oils, fruit essences, peppermint oil, spearmint oil, other mint oils, clove oil, oil of wintergreen, anise, and the like. Artificial flavoring agents and components are also contemplated. Those skilled in the art will recognize that natural and artificial flavoring agents may be combined in various acceptable fashions. Optional ingredients such as emulsifiers and pharmaceutical agents may also be added to the chewing gum. For instance, from about 0.05 weight percent to about 3 weight percent of a fluoridating ingredient can be added to the chewing gum for the prevention of dental caries. Some representative examples of fluoridating agents that can be used include alkali metal fluorides, ammonium fluoride, stannous fluoride, stannous chlorofluoride, potassium stannous fluoride, alkali metal monofluorophosphates, ammonium monofluorophosphate, and the like.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks, or casting into pellets.

Generally, the ingredients are mixed by first softening (e.g. with heat) the gum base and adding it to the running mixer. The gum base can also be softened in the mixer itself. Color or emulsifiers may also be added at this time. A softener, such as glycerin, may also be added at this time along with syrup and a portion of the bulking agent. Further portions of the bulking agent portion may then be added to the mixer. A flavoring agent is typically added with the final portion of the bulking agent.

The entire mixing procedure typically takes from five to fifteen minutes, but longer mixing times may sometimes be required. Those skilled in the art will recognize that variations of the above described procedure, or different procedures, may be followed.

This invention is illustrated by the following example that are merely for the purpose of illustration and are not to be regarded as limiting the scope of the invention or the manner in which it can be practiced. Unless specifically indicated otherwise, parts and percentages are given by weight.

EXAMPLE

In this experiment SBR latex was stabilized by adding 0.3 phr of Guardian GP (from Cultor Food Science) thereto. Guardian GP is a natural extract of rosemary containing carnosic acid having the aroma and flavor characteristics of rosemary. The SBR latex was subsequently coagulated and dried.

The stabilized SBR was then aged at 70° C. in a forced air circulating oven for 28 days. The elastic modulus (G') at 50 rpm and Mooney ML1+4 viscosity at 100° C. of the SBR sample were measured after 3 days, 7 days, 14 days, 21 days, and 28 days. A control SBR that was stabilized with 0.3 phr of BHA was also evaluated. The results of this evaluation are shown in Table I (Mooney ML1+4 viscosity) and Table II (G').

TABLE I

Mooney ML1 + 4 Viscosity at 100°

| Days of Aging | Carnosic Acid Stabilized | BHA Stabilized |
|---|---|---|
| 0 | 55.7 | 54.7 |
| 3 | 60.2 | 55.7 |
| 7 | 60.3 | 50 |
| 14 | 58.4 | 32.8 |
| 21 | 58.4 | 30.8 |
| 28 | 55 | 33.6 |

TABLE II

G' at 50 rpm

| Days of Aging | Carnosic Acid Stabilized | BHA Stabilized |
|---|---|---|
| 0 | 80.3 | 81.9 |
| 3 | 80.3 | 78.0 |
| 7 | 79.6 | 68.9 |
| 14 | 77.3 | 46.7 |
| 21 | 77.3 | 27.6 |
| 28 | 75.7 | 25.2 |

This experiment shows that the carnosic acid in the rosemary extract was highly effective at maintaining original elastic properties after heat aging for 28 days. In fact, the carnosic acid proved to be superior for stabilizing the SBR as compared to BHA.

While certain representative embodiments and details have been shown for the purpose of illustrating the subject invention, it will be apparent to those skilled in this art that various changes and modifications can be made therein without departing from the scope of the subject invention.

What is claimed is:

1. A chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) 0.0001 phr to 1 phr of carnosic acid, and (5) lecithin, wherein said chewing gum base is void of sweeteners.

2. A chewing gum base as specified in claim 1 wherein lecithin emulsifies the carnosic acid.

3. A gum base as specified in claim 2 wherein the rubbery polymer is styrene-butadiene rubber and wherein maid gum base contains from about 10 weight percent to about 70 weight percent of the styrene-butadiene rubber.

4. A gum base as specified in claim 3 wherein the carnosic acid is present at a level which is within the range of about 0.0005 phr to about 0.1 phr.

5. A gum base as specified in claim 4 wherein said gum base is further comprised of an additional antioxidant selected from the group consisting of carnosol, rosmanol and rosmaridiphenol.

6. A gum base as specified in claim 4 wherein said gum base contains from about 15 weight percent to about 45 weight percent of the styrene-butadiene rubber.

7. A gum base as specified in claim 3 wherein the carnosic acid is present at a level which is within the range of about 0.001 phr to about 0.05 phr.

8. A gum base as specified in claim 3 wherein the carnosic acid is present at a level which is within the range of about 0.01 phr to about 0.03 phr.

9. A gum base as specified in claim 2 wherein said gum base contains from about 5 to about 45 weight percent of the elastomer plasticizer.

10. A gum base as specified in claim 9 wherein the elastomer plasticizer is a natural rosin ester.

11. A gum base as specified in claim 9 wherein the elastomer plasticizer is a synthetic terpene resin.

12. A gum base as specified in claim 2 wherein said gum base contains from about 10 to about 30 weight percent of the elastomer plasticizer.

13. A gum base as specified in claim 2 wherein said gum base is further comprised of up to 30 weight percent of a wax selected from the group consisting of natural waxes, synthetic waxes, petroleum waxes, and mixtures thereof.

14. A gum base as specified in claim 2 further comprising between 0.5 and 40 weight percent of a softener selected from the group consisting of tallow, hydrogenated tallow, hydrogenated and partially hydrogenated vegetable oils, cocoa butter, glycerol monostearate, glycerol triacetate, lecithin, monoglycerides, diglycerides, triglycerides, fatty acids, and mixtures thereof.

15. A gum base as specified in claim 2 wherein the filler material comprises one or more materials selected from the group consisting of magnesium carbonate, calcium carbonate, ground limestone, magnesium silicate, aluminum silicate, clay, alumina, talc, titanium oxide, monocalcium phosphate, dicalcium phosphate, tricalcium phosphate, cellulose polymers, wood and mixtures thereof.

16. A gum base as specified in claim 1 wherein said gum base is void of humectants.

17. A gum base as specified in claim 16 wherein said gum base is void of flavoring agents.

18. A chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) 0.0001 phr to 1 phr of carnosic acid, and (5) lecithin, wherein said chewing gum base is void of flavoring agents.

19. A chewing gum base comprising: (1) about 5 weight percent to about 95 weight percent of a rubbery elastomer; (2) about 0 weight percent to about 75 weight percent of an elastomer plasticizer selected from the group consisting of natural rosin esters and synthetic terpene resins; (3) about 1 weight percent to about 65 weight percent of a filler material; (4) 0.0001 phr to 1 phr of carnosic acid, and (5) lecithin, wherein said chewing gum base is void of colorants.

* * * * *